United States Patent [19]

Wuttke

[11] Patent Number: 4,819,175

[45] Date of Patent: Apr. 4, 1989

[54] NAVIGATION EQUIPMENT FOR A MOVING VEHICLE

[75] Inventor: Gero Wuttke, Regensburg, Fed. Rep. of Germany

[73] Assignee: Siemens Aktiengesellschaft, Berlin and Munich, Fed. Rep. of Germany

[21] Appl. No.: 98,087

[22] Filed: Sep. 18, 1987

[30] Foreign Application Priority Data

Sep. 25, 1986 [DE] Fed. Rep. of Germany ....... 3632619

[51] Int. Cl.$^4$ .............................................. G06F 15/50
[52] U.S. Cl. .................................... 364/449; 340/990; 340/995; 364/571.04
[58] Field of Search ............... 364/424, 443, 444, 449, 364/571, 450, 457; 340/988, 990, 995; 73/178 R

[56] References Cited

U.S. PATENT DOCUMENTS

| | | | |
|---|---|---|---|
| 4,388,608 | 6/1983 | Bernard | 364/450 |
| 4,550,317 | 10/1985 | Moriyama et al. | 340/995 |
| 4,688,176 | 8/1987 | Hirata | 364/449 |
| 4,689,747 | 8/1987 | Kurose et al. | 364/449 |
| 4,737,916 | 4/1988 | Ogawa et al. | 340/990 |

OTHER PUBLICATIONS

Bosch Technische Berichte—1986 ISSN 0006-789X Band 8.

Primary Examiner—Gary Chin
Attorney, Agent, or Firm—Hill, Van Santen, Steadman & Simpson

[57] ABSTRACT

A navigation equipment for a moving vehicle which includes a magnetic field probe 1 and a travel distance meter 2 which supplies position values Xa, Ya using dead-reckoning navigation which can be checked with a street map. The street map is digitally represented in a plat memory 4 using a network 42 which has meshes comprising network elements 421. The network elements 421 uses a binary 1 which represents a street and in other positions utilize a binary 0. The addresses of the network elements 421 in the plat memory 4 are ordered according to an x-y coordinate system and are addressable with the position coordinates Xa and Ya. The correction stage 5 checks a position indication Xa, Ya for a street value 1 or a 0 (deviant value) and when k successive deviant values occur, they are successively shifted in direction until street values result. The resulting shift values are then added as a correction value to every position indication Xa, Ya afterwards.

5 Claims, 3 Drawing Sheets

| NETWORK PART NO. | SIDE LENGTHS (UNIT K) | EDGE LENGHT K (M) | STARTING ADDRESS IN THE PLAT MEMORY | REFERENCE VECTO $Q_n$ (UNIT K) | NEIGHBORING NETWORK PARTS |
|---|---|---|---|---|---|
| ⋮ | | | | | |
| 8 | | | | | |
| 9 | | | | | |
| 10 | 256 | 10 | C6E4H | 840/325 | NORTH: 13<br>SOUTH: 16<br>EAST: $PQ_y=0...127:15$<br>$PQ_y=128...255:14$<br>WEST: 12 |
| 11 | | | | | |
| 12 | | | | | |
| ⋮ | | | | | |

NAVIGATION EQUIPMENT FOR A MOVING VEHICLE

BACKGROUND OF THE INVENTION

1. Field of the Invention

The invention relates in general to a navigation equipment for a moving vehicle which utilizes a magnetic field probe for obtaining measured values for the direction of travel and uses a distance travel meter for acquiring measured values for the travel distance and further uses a plat memory and a digitized map of a region in a coordinate system.

2. Description of the Prior Art

These are Navigation equipment which identify the current position of a vehicle from measured directional values obtained with a magnetic field probe and use a travel distance meter. From direction and the travel distance are produced vectors which are coupled to each other so as to form a chain of vectors the end point of which represents the current position. Due to magnetic disturbances and other factors errors result which can become very large during long journeys. Positions indicated may be in error particularly in urban areas where the magnetic disturbance frequently occurs and wherein there is an increased demand of precision due to the dense street network.

So as to correct these position errors, it is assumed that a vehicle will normally move only on streets and that all identified positions which do not lie on the street are thus incorrect.

For this purpose, navigation equipment contains a plat memory in which a street map is stored in digitized form so as to compare the measured position with such street map and to correct the actual position. A navigation equipment comprising a digitized city map is described, for example, in the publication LOLA final report ("Experimentalstudie uber die Moglichkeit der Lokalisierung von Landfahrzeugen LOLA, Paragraph 32). The individual streets of the street map are thus each defined by a polygonal drawing composed of at least two pairs of coordinate points. The more pairs of coordinate points which are required for the description of a street defines in greater detail the curved course of a street or how irregular it is. A further pair of coordinate points identifies each street junction or intersection and it is important first to mark the beginning and end of the street and second to determine the three dimensional arrangement of the streets relative to each other.

This known navigational equipment checks whether a measured positional indication of the vehicle lies on one of the polygonal plats of the course of a large city. When deviations occur, it calculates that point on the street lying closes to the position indication and processes this point in continued navigation. The memory space required for such a digital street map, for example, for the plat of a large city is in the order of a few hundred kilobytes.

The memory is practically completely searched at every comparison and every correction of a positional indication. The shortest distance between the positional indication and the connecting line between the individual pairs of coordinate points must be obtained and this requires a considerable cost outlay for the equipment.

SUMMARY OF THE INVENTION

It is an object of the present invention to provide navigational equipment such as described above wherein the digitally stored street map requires very little memory space.

It is a feature of the present invention that the organization of the plat memory is designed such that the memory addresses of the associated street data are directly allocated to the identified positional indications of the vehicle.

The street map of a region is overlayed by a network which form uniform network elements. Two different properties with respect to the street can be associated to these network elements without ambiguity. A network element either has a part of or its entire area lying on a street—a positive network element or it does not lie on a street—a negative network element. Thus, it is to be understood that the term "street" means any area that is provided for travel by a vehicle. The network elements which lie on streets are identified by "1" and those that do not lie on a street are identified by "0", for example.

The street map is thus completely described by a network comprising binary ones and zeroes for the network elements. Every binary character of a network element is stored under an address which corresponds to a three-dimensional position in a coordinate system. Since the measured position indications of the vehicle are also referred to a coordinate system, the addresses of the associated network elements can be calculated from the positional information. The calculation is thus merely limited to the fact of considering various origins of the coordinate systems and different coordinate scales.

The navigation system is thus capable of directly addressing that particular memory cell whose content has a binary 0 or a binary 1 which indicates whether the positional indication coincides with a street and is capable of addressing such memory cell directly from a position indication of the vehicle without searching the full memory.

When the navigation system identifies a deviation from the course of travel defined by the position indications from the course of the streets, then this course of travel is stored in an error memory. A correction stage changes the travel course by shifted value in every direction until a correction value which is a vector has been found so that the travel course is shifted using the vector and again fits onto the path of a street.

This correction value is then handled either like one of the subvectors, in other words, is incremented once to the preceding subvector or another possibility is to leave the travel course identified by the subvectors unchanged and to add the correction value to every positional indication following a correction.

Other objects, features and advantages of the invention will become apparent from the following description of certain preferred embodiments thereof taken in conjunction with the accomanying drawings although variations and modifications may be effected without departing from the spirit and scope of the novel concepts of the disclosure, and in which:

BRIEF DESCRIPTION OF THE DRAWINGS

FIG. 5a is a portion from the street map of FIG. 2; and

FIG. 5b is a table illustrating the street map of FIG. 5a.

DESCRIPTION OF THE PREFERRED EMBODIMENTS

Figure 1:
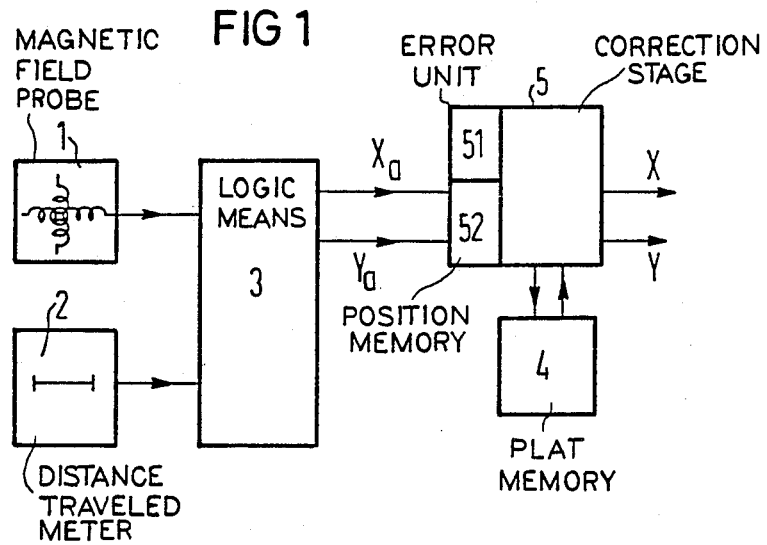
FIG. 1 is a block diagram of a navigation system.

FIG. 1 illustrates the navigation equipment of the invention which can be mounted in a moving vehicle and includes a magnetic field probe 1 which supplies an output to a logic means 3. A travel distance meter 2 also supplies an input to the logic means 3. The logic means 3 supplies an output to a correction stage which is connected to a plat memory 4. The correction stage includes an error unit 51 and a position memory 52.

The magnetic field probe measures the earth's magnetic field and continuously provides measured values to the logic means which identify the direction of travel of the vehicle. The travel distance meter 2 measures the distance travelled and forwards its output to the logic means 3. The logic means 3 produces position indications Xa and Ya from these inputs which are referred to a Cartesian coordinate system and, thus, the vehicle's position is known and these positional indications are supplied to the position memory 52 of the correction stage 5.

The correction stage 5 checks whether the measured position indications Xa and Ya lie on a street and checks this by comparing these signals to a digitally stored street map. For this purpose, the correction stage is connected to the plat memory 4 wherein the street map information is stored.

Figure 3:
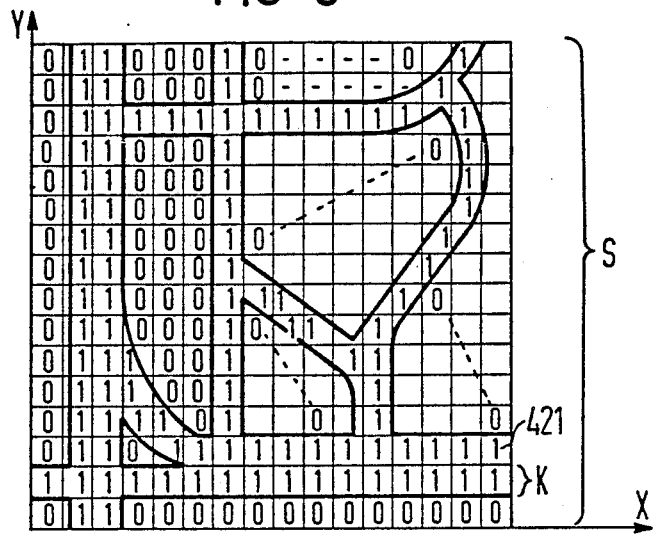
FIG. 3 is a part of a street map of a region which is overlaid with a network composed of network elements.

The street map is stored in digital form in the plat memory 4 and it is overlaid by a network of 42 network elements 421 of identical sizes as illustrated in FIG. 3. The network elements 421 are quadratic such that their edge length K depends on the density of the streets. Where streets occur in great density, the edge length amounts to, for example, 10 m and with streets which are less dense, the edge lengths may be 50 m. Each network element 421 (positive network elements) with the majority of its area lying on a street is identified by the binary number 1 and the remaining native network elements 421 are identified by the binary number 0.

Figure 2:
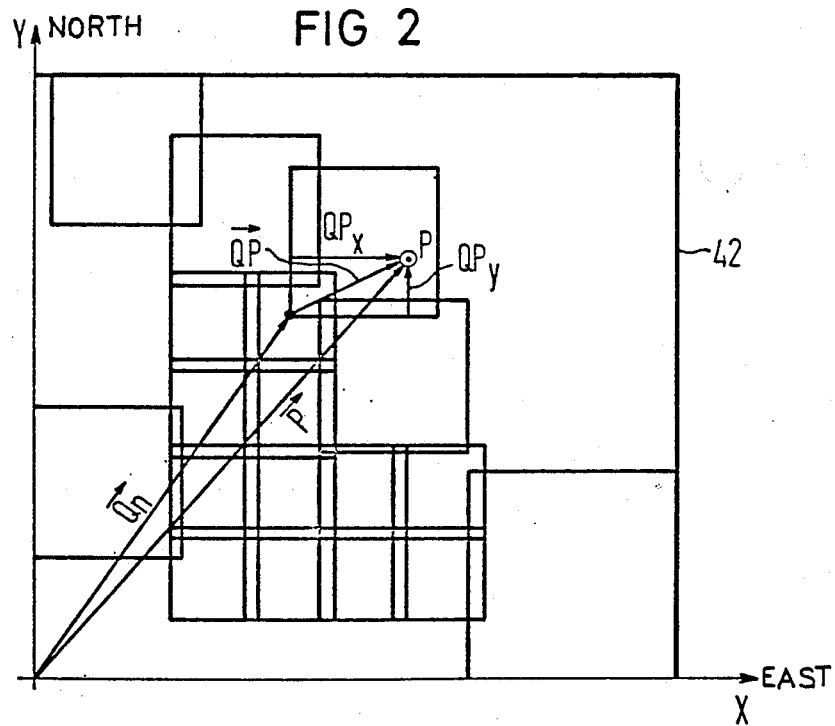
FIG. 2 is a street map of a region which is overlaid with n network components.
Figure 4:
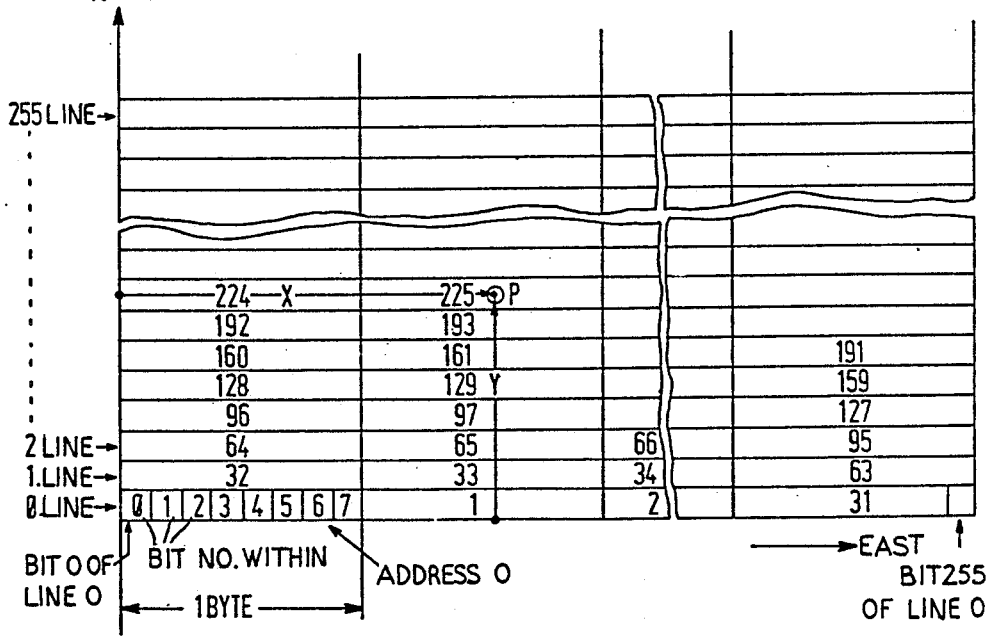
FIG. 4 illustrates the data organization for the street map in a plat memory.

The overall network 42 of a street map is divided into network portions as shown in FIG. 2 with one of the portions having a side length S and forming a Cartesian coordinate system having the axes x, y as shown in FIG. 3. The binary characters of the network element 421 are organized on the plat memory 4 as shown in FIG. 4. In this example, the network part has a side length S of 2.56 km and is subdivided into network elements 421 having an edge length K of 10 m. The overall network part then contains $2^{16}$ network elements 421 each of which requires one bit of memory. As shown in FIG. 4, the binary characters of the network elements 421 are divided into 256 lines which are horizontal above one another and each of these lines is 256 bits long. Beginning at the $0^{th}$ line, eight continuous bits form one byte so that every line contains 32 bytes. These bytes are continuously and consecutively numbered by lines from the left to right beginning with byte 0 of the $0^{th}$ line so that the first line begins with byte 32 and the second line begins with byte 64 and so forth.

In FIG. 4, the numbering is illustrated for some examples.

The eight bits within every byte are also consecutively numbered and this is shown with reference to the example of byte 0 of the $0^{th}$ line in FIG. 4.

The address of a position indication $X_a$, $Y_a$ thus is $Y_a$ is 32 and $X_a$ is 8.

It is thus assumed that the positional indication $X_a$, $Y_a$ is present in the unit having an edge length K. The whole numbered part of the result of the above equation is thus the number of the byte and the remainder which can no longer be divided by a whole number is the number of the bit within such byte.

An example of the address calculation is entered in FIG. 4. Let the point P be a positional indication $X_a$, $Y_a$ measured by the navigation equipment where $X_a = 0.12$ km and $Y_a = 0.07$ km. Expressed in the unit of the edge length K of the network element 421 (= 10 m), $X_a = 12$ and $Y_a = 7$ and the address is obtained is: Byte 225, Bit No. 4.

The correction stage 5 thus reads the bit No. 4 of the address 225 out of the plat memory 4. When the contents of this memory cell is a 1, the checked positional indication $X_a$, $Y_a$ falls on a street value and when it is 0 then there is a deviant value. This is because since it is known that the vehicle is on a street when the indication is that it is off a street a deviant occurs.

The individual network parts of the network 42 have different side lengths S and different edge lengths K for their network elements and this is expedient when the network 42 for example, covers a dense inner city street network and also simultaneously covers an outlying area which has a very thin street network. When the correction stage 5 identifies that the vehicle has reached the boundary of a network part then it switches to the next network part. FIG. 2 shows such a region covered by a plurality of network parts. The network parts overlap at the edges so as to achieve "hysteresis effect" for switching from one network to another so that a constant back and forth switching is prevented.

Each of the network parts has a reference vector Q which fixs the position of the lower left corner of the network part relative to the origin of the coordinate system of the entire network 42. By way of example, the reference vector $Q_n$ for an $n^{th}$ network part is entered in FIG. 2. A positional point of the vehicle lying in this $n^{th}$ network part has a vector P which is determined by the positional indication $X_a$, $Y_a$. With these two vectors $Q_n$ and $P_n$, the positional vector QP of the vehicle within the $n^{th}$ network can be calculated as $QP = P - Q_n$. (Equation 1) The components of QP, $QP_x$ and $QP_y$ allow that the calculation of the address within the $n^{th}$ network part analogous to the example described.

Figures 5A, 5B:
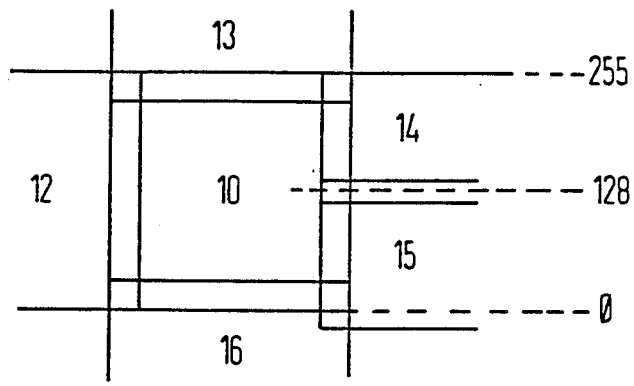

The parameters of the individual network parts are stored in tabular form in the plat memory 4. FIG. 5a illustrates a portion of the street map of a region shown in FIG. 2 and FIG. 5b is a listing of the parameters in tabular form.

The table of FIG. 5b is executed with reference to the example of a network part number 10. The first column of the table indicates the network part number. The next two columns indicate the side length S of the network expressed in the unit K of the network elements 421 and also indicates the edge length K of the network elements 421 in meters. The fourth column indicates the starting address of this network in the plat memory 4, in other words, that location in the memory beginning where the data of the network part number 10 are stored. Column number 5 lists the components of the reference vector $Q_n$ of the network part. The last column 6 indicates the neighboring network parts. In the north direction, there is the network part numbered 13 as illustrated in FIG. 5a and the network numbered 16 is in the south direction. The network part numbered 12 is in the west direction. Two network parts 14 and 15 lie in the east direction. So as to discriminate these two network parts in terms of their spatial position relative to the network part numbered 10, their position is indicated by the component $QP_y$ of the position vector of the network part number 10. Accordingly, the network part numbered 15 lies in the region of $QP_y$ from 0–127 and the network part 14 lies in the region $QP_y$ from 128–255.

When the correction stage 5 determines that the positional indications $X_a$ $Y_a$ of the vehicle have reached the boundary of a network part then it switches to the corresponding neighboring network part according to the particulars in the table of FIG. 5b.

Only when the navigational equipment is placed in operation, is it necessary that the plat memory 4 be searched one time so as to determine the network part in which the first measured position indication $X_a$, $Y_a$ lies. For this purpose, the subtraction of equation 1 is executed with the first measured positional indication $X_a$, $Y_a$ for each of the reference vectors $Q_n$. That reference vector $Q_n$ which produces the vector QP whose components $QP_x$ and $QP_y$ are positive and which have a minimum size indicates the particular network part.

When a deviation of the travel path determined by the positional indications $X_a$ and $Y_a$ from the street courses occur due to, for example, a strong magnetic disturbance, the course of travel is normally not only shifted parallel relative to the street path, but is also deformed. After the disturbance decays, however, a parallel shift of the travel course as compared to the street path continues to exist since the dead-reckoning navigation considers the deformed travel course. The correction stage 5 serves the purpose of correcting this parallel shift of the travel path. It always executes a check to see whether a position indication $X_a$, $Y_a$ is a street value or a deviant value whenever the vehicle is moved by one unit of the edge length K of a network element 421 in the east/west or the north/south direction. In comparison to the determination of the positional indication $X_a$, $Y_a$, thus, the check is made in relatively rough steps.

The correction stage 5 counts those positional indications $X_a$, $Y_a$ which are recognized as deviant values which occur in immediate succession. When the deviant values do not occur in immediate succession, but at a distance from one another, (greater than 3) then these are individual random errors which are not considered since valid street values which can be utilized always follow. When by contrast, more than three deviant values follow each other then a deviation of the travel path which requires correction occurs.

The correction stage 5 stores every occurring deviant value in the error memory 51. When a street value follows the deviant value then the error memory 51 is erased. When, however, four deviant values follow each other in succession then the correction stage 5 initiates a correction.

The deposited deviant values are successively varied in all directions with a constant shift value until the shift deviant value occurs on a street. The constant shift values is selected in the unit of the edge length K of the network elements 421 so that the surrounding network elements 421 can be searched beginning with the shift value of $1 \times K$. The shift value is individually added to the deviant values for that purpose and every positional indication $X_a$, $Y_a$ which is newly acquired in that manner is again checked for street value or deviant value. When street values predominantly result in the check for a specific shift value, then a correct shift value referred to as a correction value results.

When the correction extends over the boundary between two network parts having different edge lengths K for their associated network elements 421 then the shift value is recalculated onto the new edge length K. For this purpose, it is advantageous to restrict the selected edge length K to powers of 2. (For example, 8 m, 16 m, 32 m and so forth). The recalculation of a shift value is thus limited to a simple right to left shifting thus corresponding to a division or, respectively, multiplication by 2 in the binary system.

The search region is limited to shift values up to 3K since the deviations normally lie in this region. In case no shift value which results in a street path is found, the travel course is deformed. This problem is resolved in that the error memory 51 is limited. This is designed as a shift register for acceptance of ten deviant values so that only the ten current deviant values are contained therein and the proceeding deviant values are erased. With the vehicle, moving on, only deviant values remain which define the travel course which has been shifted parallel. The correction stage 5 thus can find a correction value.

Every correction value detained in a following correction is added to the respective preceding correction value and the result forms the current correction value.

This correction value is added to all of the following position indications $X_a$, $Y_a$ for determining the position XY such that the travel path again corresponds to the street path.

Since every correction event is fundamentally carried out for shift values in all directions, it is possible that a number of "correct" travel paths result.

The travel path is then alternately continued for all of the cases until the true travel path results no later than the next change in direction of the vehicle. If a number of such cases were to occur in succession then the number of alternative travel paths would continue to increase. This number is thus limited to three for this reason. With every added alternative travel path, that one which lies closest to the edge with reference to the region in which the alternate travel path lie is therefore no longer tracked.

The jobs of the logic means 3 of the correction stage 5 having the error unit 51 and the position memory 52 and of the plat memory 4 can be accomplished with a microcomputer including RAMs and ROMs. The error unit 51 and the position memory 52 are contained in the RAM of the microprocessor and the plat memory 4 is contained in a ROM.

Although the invention has been described with respect to preferred embodiments, it is not to be so limited as changes and modifications can be made which are within the full intended scope of the invention as defined by the appended claims.

I claim as my invention:

1. Navigation equipment for a vehicle comprising, a magnetic field probe (1) for obtaining measured values for the direction of travel, a travel distance meter (2) for obtaining measured values for the distance travelled, a plat memory (4) in which it stores a digitized street may (41) of a region in a coordinate system, a logic means (3)

which receives the outputs of said magnetic field probe and of said travel distance meter and calculates position indications of the vehicle referred to the coordinate system, and storing said indications in a position memory (52), a correction stage (5) connected to said plat memory (4) and said position memory (52) and checks every $n^{th}$ position indication and when said $n^{th}$ position indication does not lie on a street of the street map (41), said correction stage corrects said $n^{th}$ position indication to form a position value (X, Y) which corresponds to a point on a neighboring street, said street map (41) of the region is divided into a network (42) composed of network elements (421) of identical size; every network element (421) has an address in the plat memory (4) allocated to it, one of two binary characters being stored under said address, whereby one binary character identifies a positive network element (421) which lies mainly on a street and the other binary character identifies a negative network element which does not lie mainly on a street; said correction stage (5) includes an error memory (51) which contains the respectively m most recent position indications of the checked position indications which fall on a negative network element (421) which has said one binary character that indicates that the vehicle is not on a street; the position indications from the error memory (51) are successively shifted with a shift value until a correction value is found, so that the position indications shifted therewith fall on a network element (421) which lies mainly on a street and the position indications stored in the error memory (51) are subsequently erased; and every position indication is corrected by the correction value and the result is output as said position value.

2. Navigation equipment according to claim 1, wherein the street map (41) of the region is subdivided into network parts; and wherein the neighboring network parts overlap at their edges.

3. Navigation equipment according to claim 1 or 2, wherein the network elements (421) are quadratic areas.

4. Navigation equipment according to claim 1, wherein the error memory (51) is a shift register and is limited to m deviant values.

5. Navigation equipment according to claim 1, wherein every shift value is a whole multiple of an edge length K of a network element (421).

* * * * *